United States Patent
Nakazawa et al.

(10) Patent No.: US 9,677,411 B2
(45) Date of Patent: Jun. 13, 2017

(54) SEALING STRUCTURE FOR STEAM TURBINE

(71) Applicant: MITSUBISHI HEAVY INDUSTRIES, LTD., Tokyo (JP)

(72) Inventors: Tamiaki Nakazawa, Tokyo (JP); Masaru Nishikatsu, Hyogo-ken (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 512 days.

(21) Appl. No.: 13/858,350

(22) Filed: Apr. 8, 2013

(65) Prior Publication Data

US 2014/0123647 A1    May 8, 2014

(30) Foreign Application Priority Data

Nov. 6, 2012 (JP) .................................. 2012-244685

(51) Int. Cl.
*F01D 11/00* (2006.01)
*F01D 9/06* (2006.01)
(Continued)

(52) U.S. Cl.
CPC .............. *F01D 11/005* (2013.01); *F01D 9/06* (2013.01); *F01D 11/003* (2013.01); *F02C 7/28* (2013.01);
(Continued)

(58) Field of Classification Search
CPC .......... F01D 9/042; F01D 9/06; F01D 11/005; F01D 11/04; F01D 11/06; F01D 25/08;
(Continued)

(56) References Cited

U.S. PATENT DOCUMENTS 2,417,884 A     3/1947   Overstreet
3,663,024 A *   5/1972   Traub ................... F16J 15/32
                                                      277/582
(Continued)

FOREIGN PATENT DOCUMENTS

CN    201292865    8/2009
CN    102691530    9/2012
(Continued)

OTHER PUBLICATIONS

Description of AISI Type 422 Stainless Steel; obtained from the eFunda website; http://www.efunda.com/glossary/materials/alloys/materials--alloys--steel--stainless_steel--aisi_type_422.cfm; on Aug. 30, 2015;1 page.*

(Continued)

*Primary Examiner* — Mark Laurenzi
*Assistant Examiner* — Mickey France
(74) *Attorney, Agent, or Firm* — Wenderoth, Lind & Ponack, L.L.P.

(57) ABSTRACT

A stack ring is formed by an outer ring and an inner ring and is inserted in an annular gap formed between an inlet sleeve and an inner casing. The outer periphery of the outer ring and the inner periphery of the inner ring each have a land part having a flat face and taper faces formed on upper and lower sides of the land part. A ratio of $L_1$ to $L_0$ is 0.3 to 0.7 where $L_1$ is a length of the land part and $L_0$ is a total length in the up-down direction. A ratio of S to $S_0$ is not less than 0.95 where S is an area of the cross sectional shape of the outer ring or the inner ring and $S_0$ is an area of a virtual rectangle BCDE and the taper faces have an inclined angle of 1° to 10°.

4 Claims, 5 Drawing Sheets

(51) Int. Cl.
*F02C 7/28* (2006.01)
*F16J 15/44* (2006.01)

(52) U.S. Cl.
CPC ........ *F16J 15/441* (2013.01); *F05D 2220/31* (2013.01)

(58) Field of Classification Search
CPC ........ F01D 25/12; F01D 25/22; F01D 25/246; F01D 25/26; F01K 7/24; F01N 13/16; F01N 13/1827; F02C 7/18; F04D 29/061; F04D 29/582; F16J 15/025; F16J 15/126; F16L 17/025; F16L 17/035; F16L 21/025; F16L 21/03; F16L 27/073; F16L 47/10
USPC .......... 60/657; 277/409, 606, 615, 627, 644, 277/647–649; 415/134, 136, 167, 176
See application file for complete search history.

(56) References Cited

U.S. PATENT DOCUMENTS

| | | | |
|---|---|---|---|
| 4,702,671 A | 10/1987 | Brinkman et al. | |
| 4,886,281 A | 12/1989 | Ehrmann et al. | |
| 5,172,921 A | 12/1992 | Stenlund | |
| 5,433,453 A * | 7/1995 | Dalton | F16J 15/164 277/606 |
| 5,628,617 A * | 5/1997 | Dalton | F01D 9/06 277/615 |
| 2005/0006852 A1* | 1/2005 | Li | F16J 15/43 277/410 |

FOREIGN PATENT DOCUMENTS

| | | |
|---|---|---|
| JP | 59-115803 | 8/1984 |
| JP | 60-93102 | 5/1985 |
| JP | 62-9089 | 1/1987 |
| JP | 63-501440 | 6/1988 |
| JP | 4-88563 | 7/1992 |
| JP | 11-159304 | 6/1999 |
| JP | 2001-200938 | 7/2001 |
| JP | 2001-271608 | 10/2001 |

OTHER PUBLICATIONS

Description of AISI Type 422 Stainless Steel; obtained from the eFunda website; http://www.efunda.com/glossary/materials/alloys/materials--alloys--steel--stainless_steel--aisi_type_422.cfm; on Aug. 30, 2015; 1 page.*
International Preliminary Report on Patentability issued May 12, 2015 in corresponding International Application No. PCT/JP2013/061831 (with English translation).
International Search Report issued May 28, 2013 in corresponding International Application No. PCT/JP2013/061831.
Extended European Search Report issued Nov. 3, 2015 in corresponding European Application No. 13853948.1.
Notification of First Office Action issued Oct. 19, 2015 in corresponding Chinese Application No. 201380057297.9 (with English translation).
International Preliminary Report on Patentability issued May 21, 2015 in corresponding International Application No. PCT/JP2013/061831 (with English translation).
Decision to grant a patent effective Jul. 29, 2016 in corresponding Japanese Patent Application No. 2012-244685 (with English translation).

* cited by examiner

ENLARGED VIEW OF SECTION A

Related Art

SEALING STRUCTURE FOR STEAM TURBINE

BACKGROUND

The present invention relates to a seal structure having a stack ring provided in an annular gap between a casing and a steam pipe of a main steam inlet pipe or the like of a steam turbine.

BACKGROUND ART

In a steam inlet part provided in an outer casing of the steam turbine, an inlet sleeve is provided to prevent high-temperature high-pressure steam from leaking to a low-pressure steam passage which is bordered between the outer casing and an inner casing. An end of the inlet sleeve is inserted into an insertion hole formed in the inner casing, and a stack ring is provided in an annular gap between an outer periphery of the inlet sleeve and an inner periphery of the inner casing which faces the outer periphery of the inlet sleeve so as to seal the annular gap. The conventional structure of the stack ring is described in reference to FIG. 8.

Figure 8:
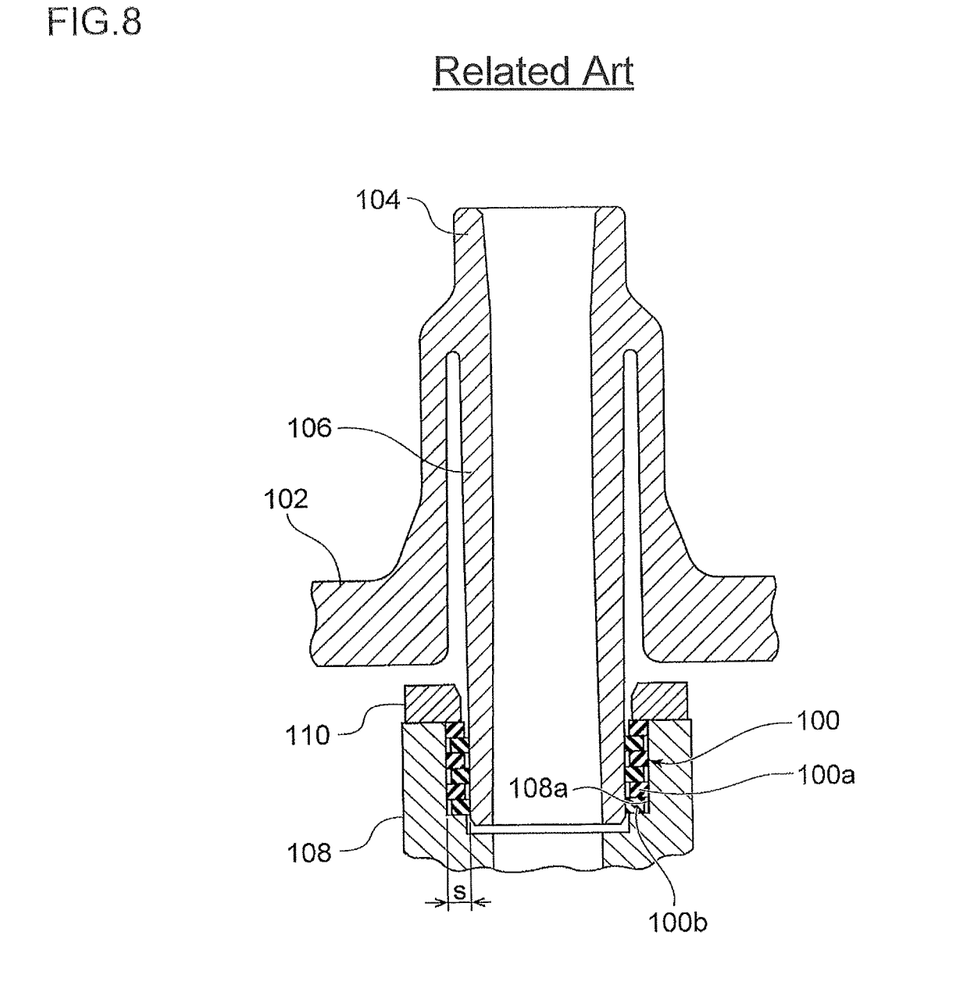
FIG. 8 is a front cross-sectional view of a seal structure of a steam pipe of a steam turbine of related art.

In FIG. 8, an inlet sleeve 106 of a main steam inlet pipe 104 formed in an outer casing 102 is provided to extend toward an inner casing 108, and a lower end of the inlet sleeve 106 is inserted in an insertion hole formed in an steam inlet part of the inner casing 108. In an annular gap s formed between the outer periphery of the inlet sleeve 106 and the inner periphery 108a of the inner casing 108, a stack ring 100 is provided. The stack ring 100 is configured to seal the annular gap s while allowing thermal expansion of the inlet sleeve 106.

The stack ring 100 is formed by a plurality of outer rings 100a and inner rings 100b having a rectangular cross section. The diameter of the outer ring 100a is slightly different from that of the inner ring 100b. The diameter of the outer ring 100a is slightly greater than that of the inner ring 100b. The outer rings 100a and the inner rings 100b are alternately arranged in an axial direction of the inlet sleeve 106. The outer ring 100a is provided to form a sealing surface with respect to the inner periphery 108a of the inner casing 108. However, the outer ring 100a is designed so that, at a normal temperature, there is a small gap between the outer ring 100a and the inner periphery of the inner casing 108. The inner ring 100b is provided to form the sealing surface with respect to the outer periphery of the inlet sleeve 106. However, the inner ring 100b is designed so that, at a normal temperature, there is a small gap between the inner ring 100b and the outer periphery of the inlet sleeve 106.

A linear expansion coefficient of the outer ring 100a is set greater than that of the inner casing 108 so that, during operation of the steam turbine, the outer periphery of the outer ring 100a and the inner periphery 108a of the inner casing 108 are in close contact with each other, thereby preventing leaking of the steam. Similarly, a linear expansion coefficient of the inlet sleeve 106 is set greater than that of the inner ring 100b so that, during operation of the steam turbine, the outer periphery of the inlet sleeve 106 and the inner periphery of the inner ring 100b are in close contact with each other, thereby preventing leaking of the steam.

Top and bottom surfaces of the outer ring 100a and top and bottom surfaces of the inner ring 100b contact with one another so as to form a sealing surface, thereby preventing leaking of the steam. Between the inner periphery of the outer ring 100a and the outer periphery of the inlet sleeve 106, and between the outer periphery of the inner ring 100b and the inner periphery of the inner casing 108, there is a gap both at the normal temperature and during the operation. A retaining member 110 is fixed to an upper end of the inner casing 108 so as to hold the upper most end of the stack ring 100 by the retaining member 110.

Disclosed in Patent Literature 1 is a steam turbine in which the inlet sleeve is formed separately from the outer casing and which has a mechanism for preventing the stack ring from coming loose from the annular gap s and also preventing rotation of the inlet sleeve. Disclosed in Patent Literature 2 is a structure of the stack ring having contact surfaces of the outer ring and the inner ring formed into spherical surfaces to prevent the steam from leaking from a gap between the outer ring and the inner ring forming the stack ring. Also disclosed in Patent Literature 2 is to allow a difference in a linear expansion coefficient between the outer ring and the inner casing so as to bring the outer ring and the inner casing into close contact during operation of the steam turbine and also to allow a difference in a linear expansion coefficient between the inner ring and the inlet sleeve so as to bring the inner ring and the inlet sleeve into close contact during operation of the steam turbine.

CITATION LIST

Patent Literature

[PTL 1]
JP 59-115803 U (Japanese Unexamined Utility Model Registration Application Publication)
[PTL 2]
JP 2001-271608

Conventionally, austenitic steel having a high linear expansion coefficient was used for the outer ring of the stack ring, and ferritic steel having a moderate linear expansion coefficient was used for the inlet sleeve and the inner casing. Further, for the inner ring, martensitic steel having a low linear expansion coefficient was used. However, in recent years, for the purpose of improving power output of the steam turbine, there was a need to increase the temperature of the steam. Accordingly, high-temperature strength of the inlet sleeve was needed to be improved as well. Therefore, the material of the inlet sleeve was changed to martensitic steel of the same kind as the material of the inner ring. As a result, the difference in the linear expansion coefficient between the inner ring and the inlet sleeve decreased, thereby making it difficult to achieve a contact pressure that is needed for sealing.

To solve this, it is possible to use supper alloy having a linear expansion coefficient that is smaller than that of martensitic steel for the inner ring. This, however, increases production costs. Alternatively, it is possible to reduce the gap between the inner ring and the inlet sleeve. This, however, requires high machining accuracy. This results in cost increase and also makes parts assembly more difficult. Illustrated in Patent Literature 1 is a chamfered contact face of the outer ring contacting the inner periphery of the inner casing and a chamfered contact face of the inner ring contacting the outer periphery of the inlet sleeve. However, it is difficult simply by chamfering the contact face to attain a contact pressure needed for sealing.

SUMMARY

In view of the above issues, it is an object of the present invention to improve sealability between the steam pipe and the casing of the steam turbine by increasing the contact pressure of the sealing surface of the stack ring without cost increase.

Solution to Problem

To achieve the above object, in a seal structure for a steam turbine according to the present invention having a stack ring provided in an annular gap between a sleeve part of a steam pipe and a casing of the steam turbine, the stack ring comprises:

at least one outer ring having an outer periphery which is in close contact with the casing; and at least one inner ring disposed alternately with the outer ring in the annular gap and having an inner periphery which is in close contact with the sleeve part of the steam pipe, and at least one of the outer ring or the inner ring has a cross sectional shape formed such that one edge of a virtual rectangle on an outer periphery side or an inner periphery side is partially cut off, and a ratio of $L_1$ to $L_0$ is not less than 0.3 and not greater than 0.7 where $L_1$ is a length of a part of the cross sectional shape of the at least one of the outer ring or the inner ring that contacts the casing or the sleeve part and $L_0$ is a length of the one edge of the virtual rectangle.

In the present invention, if the cross-sectional shape of the outer ring or the inner ring forming the stack ring is a virtual rectangular, the area of the assumed virtual rectangle is set from the perspective of achieving the rigidity required for the outer ring or the inner ring to generate the required contact pressure between the inner periphery of the inner casing and the outer ring or between the outer periphery of the sleeve part of the steam pipe and the inner ring. Next, by partially cutting the one edge of the virtual rectangle on an outer periphery side or an inner periphery side, it is possible to increase the contact pressure of the contact face. Particularly in a boundary area between the contact face and the cut-off part, the contact pressure can be increased significantly. Therefore, the contact pressure at the inner periphery of the inner casing or the outer periphery of the sleeve part of the steam pipe can be increased, thereby improving sealability. By setting the ratio of $L_1$ to $L_0$ to not less than 0.3 and not greater than 0.7, the sealability can be improved and also the sleeve part can be supported by the inner ring in a stable manner.

As a result, instead of using a stack ring formed of special material, it is possible to use a stack ring formed of a material that has been conventionally used and thus, there is no cost increase. Further, the contact pressure can be increased without reducing the gap between the stack ring and the inner periphery of the inner casing or the outer periphery of the sleeve part and thus, the existing machining accuracy suffices. As a result, the production cost does not increase and the assembly is made easy.

In the present invention, in order to secure the rigidity of the outer ring or the inner ring needed to generate required contact pressure, a ratio of S to $S_0$ may be not less than 0.95, where S is an area of the cross sectional shape and $S_0$ is an area of the virtual rectangle.

Further, the cross sectional shape may have a taper face that is formed such that both ends of the one edge of the virtual rectangle are cut off in a tapering fashion. By forming the taper face, it is possible to increase the contact pressure near the boundary between the taper face and the contact face and also to minimize decline of the rigidity of the outer ring or the inner ring. By forming the taper faces at both ends of the one edge of the virtual rectangle, it is possible to form a support face in a center area of the virtual rectangle to support the sleeve part. As a result, the sleeve part can be supported in a stable manner. By placing the sleeve part along the taper face when inserting the sleeve part, insertion of the sleeve part is made easy.

Furthermore, the taper face may have an angle of not less than 1° and not greater than 10° with respect to the contact face. As a result, the contact pressure of the contact face near the boundary between the taper face and the contact face can be maintained high, and decline of the rigidity of the outer ring or the inner ring can be minimized.

In the present invention, the cross sectional shape of the outer ring or the inner ring may have at least one depression where the one edge of the virtual rectangle is partially cut off. By reducing the area of the contact face which contacts the sleeve part or a wall surface of the casing, it is possible to increase the contact pressure. Particularly, at the contact face near the boundary between the contact face and the depression, the contact pressure of the outer ring or the inner ring can be increased, thereby improving the sealability. Further, by arranging the at least one depression dispersively, the sleeve part can be supported in a stable manner. As a result, the contact pressure can be maintained in a stable manner.

Moreover, the depression may be a pair of the depressions where both ends of the one edge of the virtual rectangle are cut off. By providing the depressions at both ends of the contact edge and forming the contact face in the center area, it is possible to prevent the contact face from inclining relative to the opposing face of the sleeve part or the like. As a result, the sleeve part can be supported in a stable manner and thus, the contact pressure can be maintained in a stable manner.

In the present invention, the cross sectional shape may have a plurality of the depressions where the one edge of the virtual rectangle is partially cut off in a comb-like fashion. By arranging the depressions dispersively, it is possible to dispersively form regions where high contact pressure is generated over the entire contact face, and also to support the sleeve part in a stable manner.

In the present invention, even in the case where the sleeve part and the inner ring are formed of martensitic steels having relatively close linear expansion coefficients, as the inner ring has the cross sectional shape formed such that the one edge of the virtual rectangle of the inner ring on the inner periphery side is partially cut off so that the ratio of $L_1$ to $L_0$ is not less than 0.3 and not greater than 0.7 where $L_1$ is the length of the part of the cross sectional shape of the inner ring that contacts the sleeve part and $L_0$ is the length of the one edge of the virtual rectangle, the contact pressure of the inner ring with respect to the sleeve part can be maintained high, and the sealability between the inner ring and the sleeve part can be improved.

Advantageous Effects

According to the present invention, it is possible to improve sealability in the annular gap formed between the casing and the sleeve part by increasing the contact pressure with respect to the outer periphery of the sleeve part of the steam pipe and the inner periphery of the inner casing.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Embodiment 1

Figure 1:
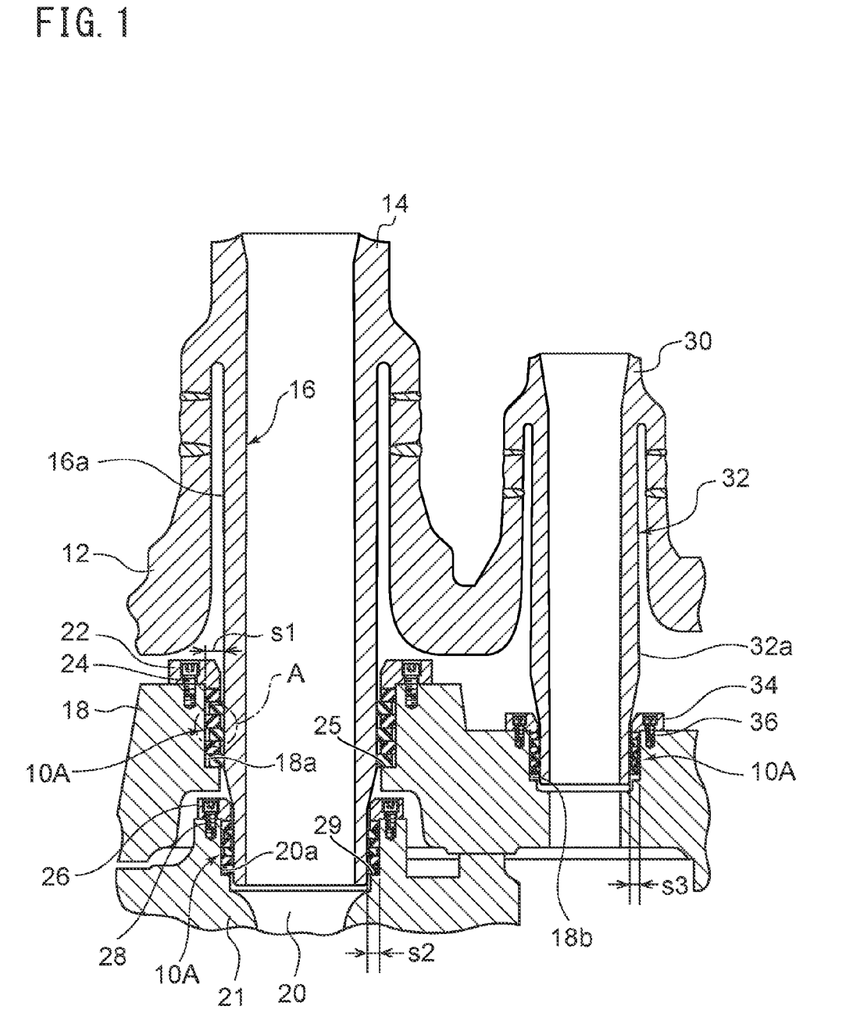
FIG. 1 is a front cross-sectional view of a part of a steam turbine to which a seal structure according to a first embodiment of the present invention is applied.

A first embodiment of the present invention is described in reference to FIG. 1. An inlet sleeve 16 of a main steam inlet pipe 14 is formed in an outer casing 12 and the inlet sleeve 16 is arranged to extend toward an inner casing 18. A lower end of the inlet sleeve 16 is inserted in an insertion hole formed in a steam inlet part of the inner casing 18. A stack ring 10A is set in an annular gap s1 formed between an outer periphery 16a of the inlet sleeve 16 and an inner periphery 18a of the inner casing 18. The stack ring 10A is configured to seal the annular gap s1. A retaining member 22 is fixed to a top end surface of the inner casing 18 with bolts 24. The retaining member 22 is configured to hold an uppermost end of the stack ring 10A. The stack ring 10A is disposed between the retaining member 22 and a step 25 formed in the inner casing 18.

The inlet sleeve 16 is inserted through the insertion hole formed in the inner casing 18 and is guided into an interior of the nozzle chamber 20. The nozzle chamber 20 is defined by a nozzle casing 21 disposed inside of the inner casing 18. In an annular gap s2 formed between the outer periphery 16a of the inlet sleeve 16 and an inner periphery 20a of the nozzle casing 21, the stack ring 10A of this embodiment is set to seal the annular gap s2. A retaining member 26 is fixed to a top end surface of the nozzle casing 21, with bolts 28 to hold an uppermost end of the stack ring 10A. The stack ring 10A is disposed between the retaining member 26 and a step 29 formed in the nozzle casing 21.

Further, an auxiliary steam inlet pipe 30 is provided in the outer casing 12 near the main steam inlet pipe 14. To increase output of the steam turbine, auxiliary steam is supplied to the inner casing 18 from the auxiliary steam inlet pipe 30. An inlet sleeve 32 of the auxiliary steam inlet pipe 30 is arranged to extend toward the inner casing 18 and is inserted in an insertion hole formed in the inner casing 18. An annular gap s3 is formed between an outer periphery 32a of the inlet sleeve 32 and an inner periphery 18b of the inner casing 18. The stack ring 10A is set in the annular gap s3 to seal the annular gap s3. A retaining member 34 is fixed to a top surface of the inner casing 18 with bolts 36 to hold an uppermost end of the stack ring 10A with the retaining member 34.

Figure 2:
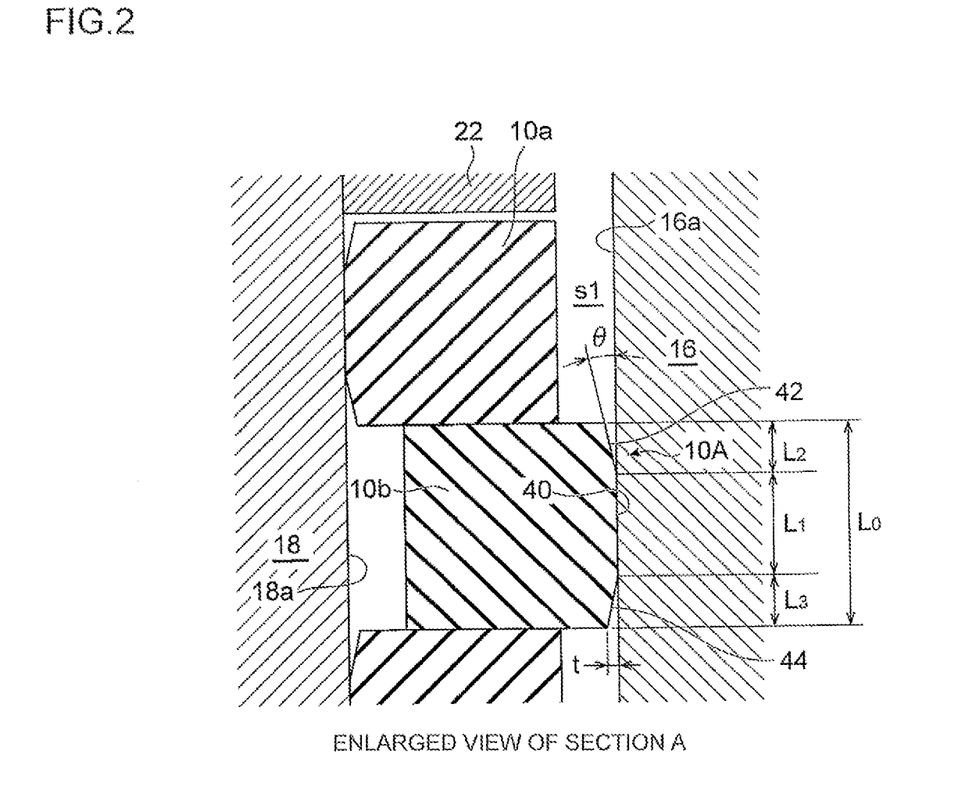
FIG. 2 is an enlarged view of section A of FIG. 1.
Figure 3:
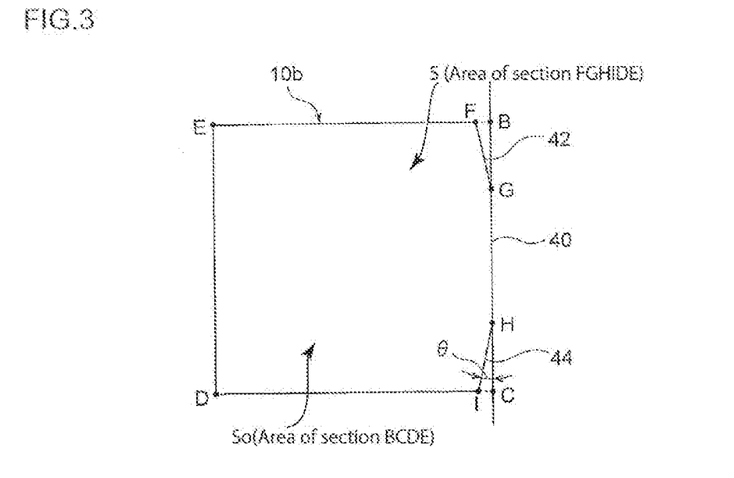
FIG. 3 is an illustration of a cross-sectional shape of a stack ring of the first embodiment.

The structure of the stack ring 10A is explained in reference to FIG. 2 and FIG. 3 using the stack ring 10A set in the annular gap s1 as an example. The stack ring 10A is formed by a plurality of outer rings 10a and inner rings 10b having a rectangular cross section. The diameter of the outer ring 10a is formed slightly greater than that of the inner ring 10b. The outer rings 10a and the inner rings 10b are alternately arranged in the annular gap s1 in an up-down direction. The outer ring 10a is designed so that, at a normal temperature, there is a small gap between the outer ring 10a and the inner periphery 18a of the inner casing 18. The inner ring 10b is designed so that, at a normal temperature, there is a small gap between the inner ring 10b and the outer periphery 16a of the inlet sleeve 16.

The outer ring 10a is formed of austenitic alloy of a high linear expansion coefficient, such as Ni—Co—Cr alloy. The inner casing 18 and the nozzle casing 21 of the nozzle chamber 20 are formed of ferritic steel having a medium linear expansion coefficient or martensitic steel having a low linear expansion coefficient. As the linear expansion coefficient of the outer ring 10a is greater than the linear expansion coefficient of the inner casing 18 and the nozzle casing 21 of the nozzle chamber 20, during operation of the steam turbine, the outer periphery of the outer ring 10a tightly contacts the inner periphery 18a of the inner casing 18 and the inner periphery 20a of the nozzle casing 21 so as to prevent leak of the steam. Due to increased output of the steam turbine, the inlet sleeve 16 is formed of martensitic steel having high strength and a low linear expansion coefficient, such as 9% Cr-1% Mo steel. The inner ring 10b is formed of martensitic steel having a low linear expansion coefficient, similarly to the inlet sleeve 16.

Top and bottom surfaces of the outer ring 10a and top and bottom surfaces of the inner ring 10b contact with one another so as to form a sealing surface, thereby preventing leaking of the steam. Between the inner periphery of the outer ring 10a and the outer periphery of the inlet sleeve 16, and between the outer periphery of the inner ring 10b and the inner periphery 18a of the inner casing 18, a gap is formed both at the normal temperature and during the operation. This makes it easier to insert the outer ring 10a and the inner ring 10b in the annular gap s1.

As illustrated in FIG. 3, when determining a cross-sectional shape of the inner ring 10b, first a virtual square BCDE of which a cross-sectional area is set to have required rigidity is defined. The inner periphery of the inner ring 10b includes a land part 40 which is disposed in the middle in parallel to the outer periphery 16a of the inlet sleeve 16, and taper faces 42 and 44 which are formed on upper and lower sides of the land part 40. An inner periphery of the land part 40 forms a contact face. The lengths of the land part 40 and the taper faces 42, 44 in the up-down direction are set so that the land part 40 is twice as long as the taper face 42 or 44. For instance, when $L_0=14.0$ mm where $L_0$ is the total length of the inner ring 10b in the up-down direction, $L_1=7.0$ mm and $L_2$ or $L_3=3.5$ mm where $L_1$ is the total length of the contact face of the land part 40 in the up-down direction and $L_2$ or $L_3$ is the length of the taper face 42 or 44 in the up-down direction. An inclination amount t at an end of the taper faces 42, 44 is $t=0.5$ mm. The cross-sectional shape of the outer ring 10a is determined in the same manner as that of the inner ring 10b and the land part and the taper faces are formed on the outer periphery.

Figure 4:
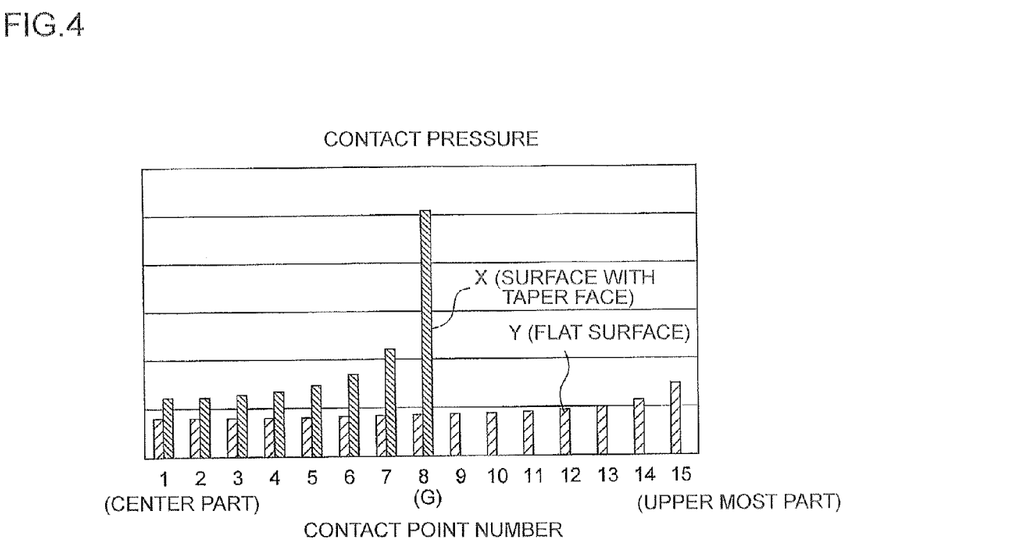
FIG. 4 is a diagram illustrating a contact pressure of the stack ring of the first embodiment.

FIG. 4 shows analytic values of contact pressures in a range from a center part (contact point 1) to the uppermost end (contact point 15) of the inner ring 10b. The analytic values X of the contact pressure are analytic values of the contact pressure in the case where the cross-sectional shape of the inner ring 10b is FGHIDE (a surface with taper faces) (see FIG. 3) according to this embodiment, whereas the analytic values Y of the contact pressure are analytic values of the contact pressure in the case where the cross-sectional shape is a virtual square BCDE (a flat surface). In general, the contact pressure of the surface with taper faces is about 1.5 times higher than that of the flat surface. Particularly at point G in the vicinity of a starting of the taper face 42, the contact pressure is remarkably high. The analytic values of contact pressures at points lower than the center part (contact point 1) of the inner ring 10b are symmetric in the up-down direction with respect to the center part (contact point 1). The outer inner ring 10a shows the same tendency as the inner ring 10b.

According to this embodiment, it is possible to increase the contact pressures of the outer ring 10a and the inner ring 10b which form the stack ring 10A and particularly in an area near the boundary between the land part 40 and the taper faces 42, 44, the contact pressure can be remarkably high. Thus, the sealability of the stack ring 10A is improved. Moreover, although the inlet sleeve 16 and the inner ring 10b are formed of martensitic steel having relatively close linear expansion coefficients, it is possible to achieve high contact pressure and high sealability. Therefore, it is not necessary to use expensive material with a small linear expansion coefficient as a material of the inner ring 10b. Thus, this creates no cost increase. Further, it is not necessary to reduce the gap between opposing surfaces and thus, the existing machining accuracy suffices. As a result, the production cost does not increase and the assembly is made easy.

As the land part 40 is formed at the center part of the outer ring 10a or the inner ring 10b in the up-down direction, contact pressure which is symmetrical in the up-down direction with respect to the center part is generated. This does not cause the outer ring 10a and the inner ring 10b to incline in the up-down direction. Therefore, the sealability at the sealing surface formed between the outer ring 10a and the inner ring 10b is always maintained favorably. As the taper faces 42 and 44 are formed on both sides of the land part 40, it is easy to insert the inlet sleeve 16.

In this embodiment, it is confirmed that sufficient contact pressure and sealability can be obtained when a ratio of $L_1$ to $L_0$ is not less than 0.3 and not greater than 0.7 where $L_1$ is a length of the contact face of the land part 40 in close contact with the inner periphery 18a of the inner casing 18 or the outer periphery 16a of the inlet sleeve 16 and $L_0$ is a total length in the up-down direction. It is confirmed that favorable sealability can be obtained without decline in the rigidity of the outer ring 10a or the inner ring 10b when a ratio of S to $S_0$ is not less than 0.95 where $S_0$ is a cross-sectional area of the virtual square BCDE and S is the cross sectional area of the outer ring 10a or the inner ring 10b of this embodiment.

It is confirmed that, when the taper faces 42, 44 have an angle θ of not less than 1° and not greater than 10° with respect to the contact face of the land part 40, favorable sealability can be obtained while generating a high contact pressure at the land part 40 near the boundary between the land part 40 and the taper faces 42, 44. Therefore, by setting the angle θ in the above range, the rigidity of the outer ring 10a and the inner ring 10b can be maintained while achieving high contact pressure.

Embodiment 2

Figure 5:
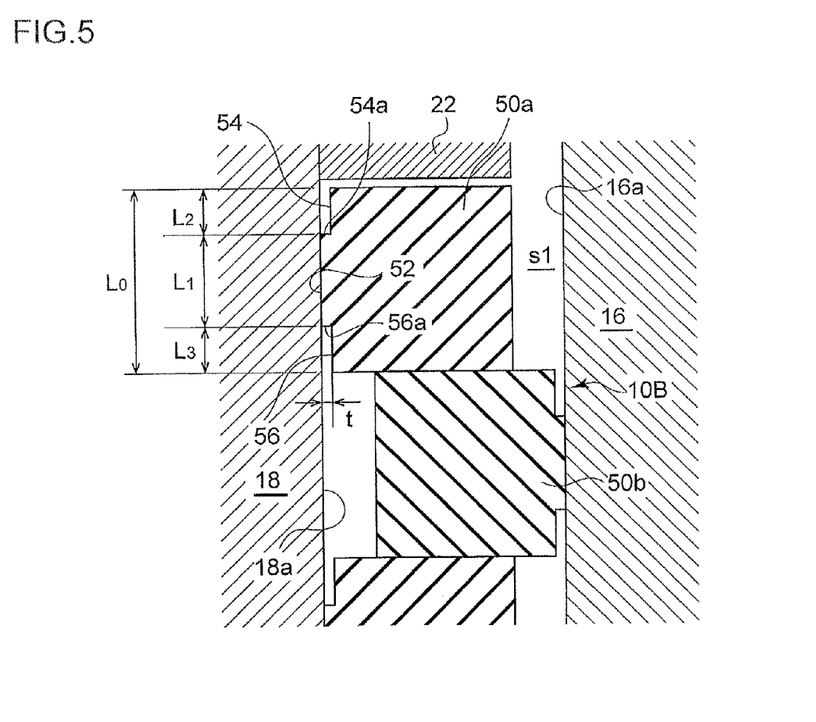
FIG. 5 is a cross-sectional view of a seal structure according to a second embodiment of the present invention.

A second embodiment of the present invention is explained in reference to FIG. 5. In this embodiment, a stack ring 10B is configured so that a face of the outer ring 50a which faces the inner periphery 18a of the inner casing 18 is formed by: a land part 52 having a flat face in the center in the up-down direction in parallel to the inner periphery 18a of the inner casing 18; a flat face 54 connected to an upper end of the land part 52 via a stepped portion 54a and disposed parallel to the inner periphery 18a; and a flat face 56 connected to a lower end of the land part 52 via a stepped portion 56a and disposed parallel to the inner periphery 18a.

The lengths of the land part 52 and the flat faces 54, 56 in the up-down direction are set so that the land part 52 is twice as long as the flat face 54 or 56. For instance, when $L_0=14.0$ mm where $L_0$ is the total length of the outer ring 50a in the up-down direction, $L_1=7.0$ mm and $L_2$ or $L_3=3.5$ mm where $L_1$ is the length of the land part 52 in the up-down direction and $L_2$ or $L_3$ is the length of the flat face 54 or 56 in the up-down direction. Further, the height t of the stepped portion 52a, 54a is t=0.5 mm. The structure of the inner periphery of the inner ring 50b is the same as the structure of the outer periphery of the outer ring 10a.

According to this embodiment, similarly to the first embodiment, it is possible to increase the contact pressures of the outer ring 50a and the inner ring 50b and also to improve the sealability. Particularly in an area at the upper and lower ends of the land part 52, the contact pressure can be increased compared to the first embodiment. In this embodiment as well, it is confirmed that sufficient contact pressure and sealability can be obtained when a ratio of $L_1$ to $L_0$ is not less than 0.3 and not greater than 0.7 where $L_1$ is a length of the part in close contact with the inner periphery 18a of the inner casing 18 or the outer periphery 16a of the inlet sleeve 16 and $L_0$ is a total length of the virtual square BCDE in the up-down direction. It is also confirmed that favorable sealability can be obtained without decline in the rigidity of the outer ring 50a or the inner ring 50b when a ratio of S to $S_0$ is not less than 0.95 where $S_0$ is a cross-sectional area of the virtual square BCDE and S is the cross sectional area of the cross-sectional shape with the taper faces of this embodiment.

Embodiment 3

Figure 6:
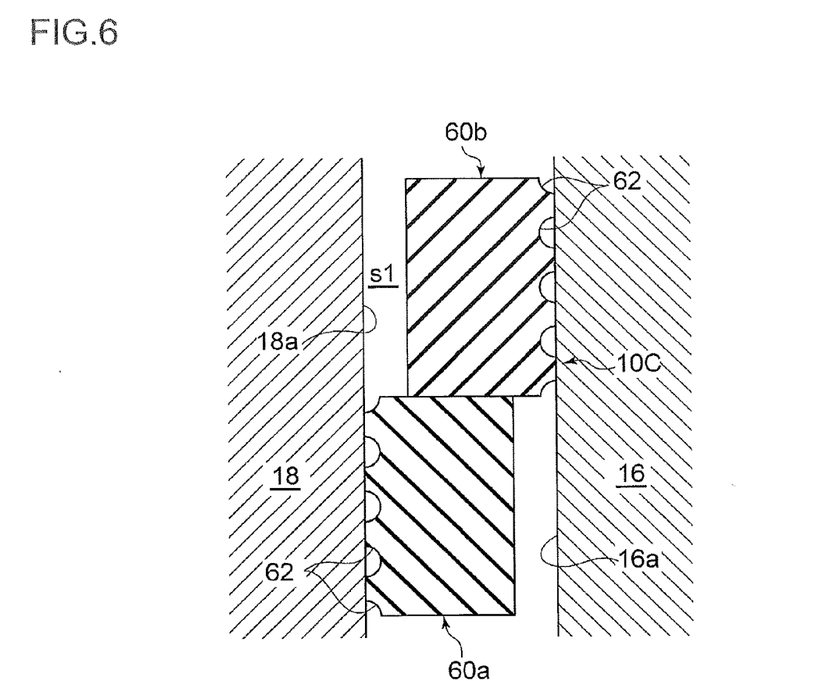
FIG. 6 is a cross-sectional view of the seal structure according to a third embodiment of the present invention.

A third embodiment of the present invention is explained in reference to FIG. 6. In this embodiment, a stack ring 10C is formed by an outer ring 60a and an inner ring 60b. The stack ring 10C is configured so that a plurality of depressions 62 having an arc-shaped cross section is formed in a contact face of the outer ring 60a contacting the inner periphery 18a of the inner casing 18 and a contact face of the inner ring 60b contacting the outer periphery 16a of the inlet sleeve 16. The depressions 62 are arranged in a horizontal direction at equal intervals. The depressions 62 are formed at the upper and lower ends of the contact faces of the outer ring 60a and the inner ring 60b. This eliminates the need to chamfer the upper and lower ends of the contact face.

According to this embodiment, the sealability can be improved and also the contact pressure can be generated evenly in the up-down direction of the outer ring 60a or the inner ring 60b. As a result, the sealing surface with respect to the inner casing 18 or the inlet sleeve 16 can be formed in a stable manner. Further, there is no chance that the outer ring 60a and the inner ring 60b incline with respect to the inner periphery 18a of the inner casing 18 and the outer periphery 16a of the inlet sleeve 16, respectively. Thus, the sealability at the sealing surface between the outer ring 60a and the inner ring 60b can be maintained favorably.

Embodiment 4

Figure 7:
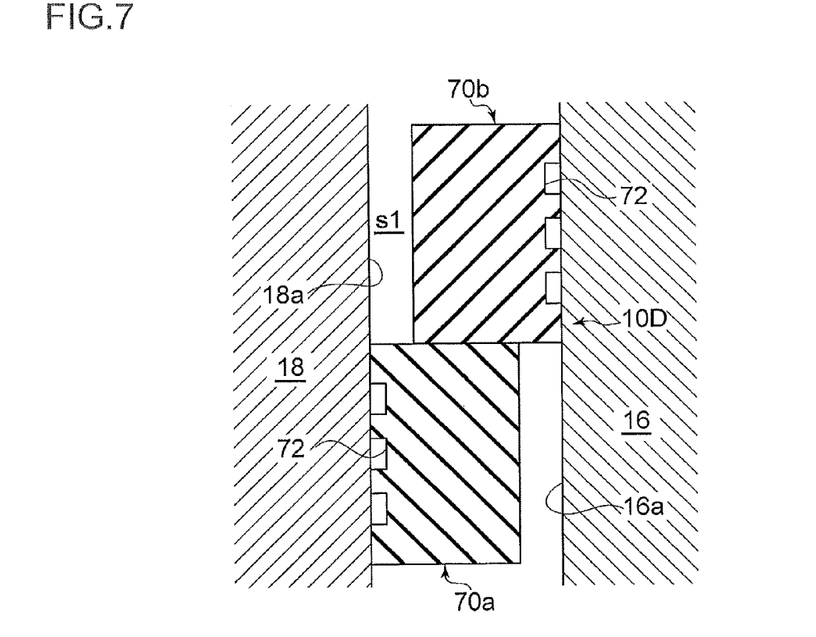
FIG. 7 is a cross-sectional view of the seal structure according to a fourth embodiment of the present invention.

A fourth embodiment of the present invention is explained in reference to FIG. 7. In this embodiment, a stack ring 10D is formed by an outer ring 70a and an inner ring 70b. The stack ring 10D is configured so that a plurality of depressions 72 having a rectangular cross-sectional shape is formed in a contact face of the outer ring 70a contacting the inner periphery 18a of the inner casing 18 and a contact face of the inner ring 70b contacting the outer periphery 16a of the inlet sleeve 16. The depressions 72 are arranged in the horizontal direction at equal intervals. According to this embodiment, the same effects as the third embodiment can be obtained. Further, as the depression 72 has a rectangular cross-sectional shape, it is relatively easy to form the depressions 72.

INDUSTRIAL APPLICABILITY

According to the present invention, it is possible to improve the sealability between the sleeve part of the steam pipe and the casing of the steam turbine by increasing the contact pressure of the sealing surface of the stack ring without cost increase.

REFERENCE SIGNS LIST 10A, 10B, 10C, 10D, 100 Stack ring
10a, 50a, 60a, 100a Outer ring
10b, 50b, 60b, 100b Inner ring
12, 102 Outer casing
14, 104 Main steam inlet part
16, 32, 106 Inlet sleeve
16a, 32a Outer periphery
18, 108 Inner casing
18a, 108a Inner periphery
20 Nozzle chamber
20a Inner periphery
22, 26, 34, 110 Retaining member
24, 28, 36 Bolt
30 Auxiliary steam inlet pipe
40, 52 Land part
42, 44 Taper face
54, 56 Flat face
54a, 56a Stepped portion
62, 72 Depression
s, s1, s2, s3 Annular gap

The invention claimed is:

1. A steam turbine comprising:
an inner casing having an insertion hole;
a nozzle casing disposed inside of the inner casing and defining a nozzle chamber;
an inlet sleeve inserted into the insertion hole so as to supply steam to the nozzle chamber inside of the inner casing;
at least one outer ring disposed in an annular gap between an inner periphery of the inner casing or the nozzle casing and an outer periphery of the inlet sleeve, the at least one outer ring having an outer periphery which is in contact with the inner periphery of the inner casing or the nozzle casing;
at least one inner ring disposed in the annular gap between the inner periphery of the inner casing or the nozzle casing and the outer periphery of the inlet sleeve, the at least one inner ring having an inner periphery which is in contact with an outer periphery of the inlet sleeve; and
retaining members fixed to the nozzle casing and the inner casing, respectively,
wherein the annular gap comprises a first annular gap formed between the nozzle casing and the inlet sleeve and a second annular gap formed between the inner casing and the inlet sleeve and separated from the first annular gap in a longitudinal direction of the inlet sleeve,
wherein the at least one outer ring and the at least one inner ring are alternately disposed in the longitudinal direction of the inlet sleeve in each of the first annular gap and the second annular gap,
wherein at least one of the at least one outer ring or the at least one inner ring has a cross-sectional shape formed such that one edge on a side of the outer periphery or the inner periphery is partially cut off in a longitudinal cross section including an axis of the inlet sleeve,
wherein, provided that a virtual rectangle is located between the inner periphery of the inner casing or the nozzle casing and the outer periphery of the inlet sleeve in the longitudinal cross section, the virtual rectangle circumscribes the cross-sectional shape of the at least one of the at least one outer ring or the at least one inner ring, and the virtual rectangle has one edge on the side of the outer periphery of the at least one outer ring or the inner periphery of the at least one inner ring, a ratio of $L_1$ to $L_0$ is not less than 0.3 and not greater than 0.7 where $L_1$ is a length of a part of the cross-sectional shape of the at least one of the at least one outer ring or the at least one inner ring that is in contact with the inner casing, the nozzle casing or the inlet sleeve and $L_0$ is a length of the one edge on the side of the outer periphery or the inner periphery,
wherein the at least one of the at least one outer ring or the at least one inner ring has a land part parallel to the inner periphery of the inner casing, the inner periphery of the nozzle casing or the outer periphery of the inlet sleeve, the land part being able to contact the inner periphery of the inner casing, the inner periphery of the nozzle casing or the outer periphery of the inlet sleeve,
wherein the at least one of the at least one outer ring or the at least one inner ring has taper faces formed on both sides of the land part so that the one edge on the side of the outer periphery or the inner periphery is partially cut off, each of the taper faces having a truncated conical shape,
wherein a first step is formed in the nozzle casing, the first step facing the first annular gap, wherein a second step is formed in the inner casing, the second step facing the second annular gap,
wherein the at least one outer ring and the at least one inner ring are disposed in the longitudinal direction of the inlet sleeve between the first step and the corresponding retaining member in the first annular gap,
wherein the at least one outer ring and the at least one inner ring are disposed in the longitudinal direction of the inlet sleeve between the second step and the corresponding retaining member in the second annular gap, and
wherein a ratio of S to S0 is not less than 0.95, where S is an area of the cross-sectional shape and S0 is an area of the virtual rectangle.

2. The steam turbine according to claim 1,
wherein a first part of the inlet sleeve defining the first annular gap has a first outer diameter and a second part of the inlet sleeve defining the second annular gap has a second outer diameter larger than the first outer diameter.

3. The steam turbine according to claim 1,
wherein each of the taper faces has an angle of not less than 1° and not greater than 10° with respect to the one edge on the side of the outer periphery or the inner periphery.

4. The steam turbine according to claim 1,
wherein the inlet sleeve and the at least one inner ring are each formed of martensitic steel, and
wherein the at least one inner ring has the cross-sectional shape formed such that the one edge on the side of the inner periphery is partially cut off so that the ratio of $L_1$ to $L_0$ is not less than 0.3 and not greater than 0.7 where $L_1$ is the length of the part of the cross-sectional shape of the at least one inner ring that is in contact with the inlet sleeve during operation of the steam turbine and $L_0$ is the length of the one edge on the side of the outer periphery or the inner periphery.

* * * * *